UNITED STATES PATENT OFFICE 2,691,667

PROCESS FOR THE MANUFACTURE OF DIFERRO-MONOCALCIUM-CITRATE

Adolf Christian Josef Opfermann,
Bergisch-Gladbach, Germany

No Drawing. Application November 20, 1951,
Serial No. 257,432

Claims priority, application Germany
November 21, 1950

9 Claims. (Cl. 260—439)

This invention relates to a new compound and to a process of manufacturing same, and relates more particularly to the manufacture of Diferro-monocalcium-citrate.

The following ferro-citrates have already been described: ferro - citrate, ferro - ammonium-citrate, ferro-sodium-citrate and ferro-potassium citrate.

The present invention relates to the manufacture of Diferro-monocalcium-citrate of the formula $CaFe_2(C_6H_5O_7)_2$, which is intended for therapeutical purposes, particularly for the treatment of secondary anaemias.

The manufacture is effected by reacting citric acid in an aqueous solution with an iron compound such as ferro hydroxide or ferro carbonate and a calcic salt, for example calcium carbonate or calcium citrate. The ferro compounds are in general substances which are easy to manufacture and with which a reaction takes place quicker and easier than for instance with ferrum reductum.

Preferably stoichiometrical amounts are used. It is possible also to use an excess of calcic salt and citric acid. As the Diferro-monocalcium-citrate in a moist condition is sensitive to oxygen, the atmospheric oxygen must be kept at a distance during the reaction. This is done by the use of a protective gas, for instance hydrogen, nitrogen or carbonic acid. The hydrogen or carbonic acid which are formed during the reaction provide a certain protection against oxidation. It is, however, expedient to introduce additional protective gases and to continue passing the gases through the reaction solution after the reaction has taken place, until all the water has been removed by distillation. The anhydrous compound is fairly resistant to the atmospheric oxygen.

Example

A solution of 2 mol citric acid in distilled water is mixed with 2 mol iron hydroxide after expelling the dissolved air by evaporation and passing nitrogen therethrough. Thereafter, 1 mol calcium carbonate is added, whereby the calcium ferro-citrate is formed whilst carbonic acid develops. In the course of these two reactions more nitrogen is introduced. Thereupon the water is expelled by heating up to 200°, whilst further protective gas is passed through. The analysis of the yellowish crystal powder obtained gave the following data:

| Found | Calculated |
|---|---|
| 25.8% C | 27.1% C |
| 2.10% H | 1.89% H |
| 21.1% $Fe^{II}$ | 21.10% $Fe^{II}$ |

I claim:

1. Process for the manufacture of Diferro-monocalcium-citrate of the formula

consisting in reacting citric acid in an aqueous solution with an inorganic ferrous compound and a calcium salt in the proportion of at least two mols citric acid:two mols ferrous compound:one mol calcium salt, the water being expelled after the reaction has been completed until the completely anhydrous citrate remains.

2. Process for the manufacture of Diferro-monocalcium-citrate of the formula

consisting in reacting citric acid in an aqueous solution with ferrous hydroxide and a calcium salt, in the proportion of at least two mols citric acid:two mols ferrous hydroxide:one mol calcium salt, the water being expelled after the reaction has been completed until the completely anhydrous citrate remains.

3. Process for the manufacture of Diferro-monocalcium-citrate of the formula

consisting in reacting citric acid in an aqueous solution with ferrous carbonate and a calcium salt, in the proportion of at least two mols citric acid:two mols ferrous carbonate:one mol calcium salt, the water being expelled after the reaction has been completed until the completely anhydrous citrate remains.

4. Process for the manufacture of Diferro-monocalcium-citrate of the formula

consisting in reacting citric acid in an aqueous solution with an inorganic ferrous compound and calcium citrate, in the proportion of at least two mols citric acid:two mols ferrous compound:one mol calcium citrate, the water being expelled after the reaction has been completed until the completely anhydrous citrate remains.

5. Process for the manufacture of Diferro-monocalcium-citrate of the formula $$CaFe_2(C_6H_5O_7)_2$$

consisting in reacting citric acid in an aqueous solution with an inorganic ferrous compound and calcium carbonate, in the proportion of at least two mols citric acid:two mols ferrous compound: one mol calcium carbonate, the water being expelled after the reaction has been completed until the completely anhydrous citrate remains.

6. Process for the manufacture of Diferro-monocalcium-citrate of the formula $$CaFe_2(C_6H_5O_7)_2$$

consisting in reacting citric acid in an aqueous solution with an inorganic ferrous compound and a calcium salt in the proportion of two mols citric acid:two mols ferrous compound:one mol calcium salt, the water being expelled after the reaction has been completed until the completely anhydrous citrate remains.

7. Process for the manufacture of Diferro-monocalcium-citrate of the formula $$CaFe_2(C_6H_5O_7)_2$$

consisting in reacting citric acid in an aqueous solution with an inorganic ferrous compound and a calcium salt in the presence of a protective gas in the proportion of at least two mols citric acid: two mols ferrous compound:one mole calcium salt, the water being expelled after the reaction has been completed until the completely anhydrous citrate remains.

8. Process for the manufacture of Diferro-monocalcium-citrate of the formula $$CaFe_2(C_6H_5O_7)_2$$

consisting in reacting citric acid in an aqueous solution with an inorganic ferrous compound and a calcium salt in the proportion of at least two mols citric acid:two mols ferrous compound:one mol calcium salt, the water being expelled by means of a current of protective gas after the reaction has been completed until the completely anhydrous citrate remains.

9. Process for the manufacture of Diferro-monocalcium-citrate of the formula $$CaFe_2(C_6H_5O_7)_2$$

consisting in reacting citric acid in an aqueous solution with an inorganic ferrous compound and a calcium salt in the proportion of two mols citric acid:two mols ferrous compound:one mol calcium salt, in the presence of a protective gas, the water being expelled after the reaction has been completed by means of a current of protective gas until the completely anhydrous citrate remains.

References Cited in the file of this patent

UNITED STATES PATENTS

| Number | Name | Date |
| --- | --- | --- |
| 2,081,547 | Mattheus | May 25, 1951 |

OTHER REFERENCES

Harada, Institute of Physical and Chemical Research, Scientific Papers (Tokyo), vol. 41, pages 177–181 (1943).